(12) United States Patent
Ingale et al.

(10) Patent No.: US 9,392,542 B2
(45) Date of Patent: Jul. 12, 2016

(54) METHOD AND DEVICE FOR DETECTING INTER-FREQUENCY CELL SIGNALS IN A HETEROGENEOUS NETWORK

(71) Applicant: Samsung Electronics Co., Ltd., Suwon-si, Gyeonggi-do (KR)

(72) Inventors: Mangesh Abhimanyu Ingale, Bangalore (IN); Sudhir Kumar Baghel, Bangalore (IN); Nitin Jain, Bangalore (IN); Satish Nanjunda Swamy Jamadagni, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 14/385,374

(22) PCT Filed: Mar. 18, 2013

(86) PCT No.: PCT/KR2013/002199
§ 371 (c)(1),
(2) Date: Sep. 15, 2014

(87) PCT Pub. No.: WO2013/137700
PCT Pub. Date: Sep. 19, 2013

(65) Prior Publication Data
US 2015/0092578 A1    Apr. 2, 2015

(30) Foreign Application Priority Data

Mar. 16, 2012   (IN) .............................. 981/CHE/2012

(51) Int. Cl.
*H04W 52/02* (2009.01)
*H04W 24/10* (2009.01)
(Continued)

(52) U.S. Cl.
CPC .......... *H04W 52/0209* (2013.01); *H04W 24/10* (2013.01); *H04W 48/12* (2013.01); *H04W 48/16* (2013.01); *H04W 92/04* (2013.01)

(58) Field of Classification Search
CPC ..... H04W 24/10; H04W 48/12; H04W 48/16; H04W 52/0209; H04W 92/04; H04W 52/02; H04W 52/0225; H04W 52/40; H04W 84/045
See application file for complete search history.

(56) References Cited

U.S. PATENT DOCUMENTS 6,463,307 B1   10/2002   Larsson et al.
8,306,539 B2 *  11/2012   Chou ................ H04W 36/0088
                                         370/331

(Continued)

OTHER PUBLICATIONS

Luis M. Correia et al., Challenges and Enabling Technologies for Energy Aware Mobile Radio Networks, Nov. 2010, IEEE Communications Magazine, See abstract; p. 66, right col., line 1 – p. 71, left col., line5; figs. 1-2.

*Primary Examiner* — Ahmed Elallam
(74) *Attorney, Agent, or Firm* — Jefferson IP Law, LLP

(57) ABSTRACT

A method for reducing consumption of battery power of User Equipment (UE) during inter-frequency cell detection in a Heterogeneous Network (HetNet) is provided. The method includes receiving an indication from a serving cell operating on a first frequency layer about presence of a beacon signal transmission on the first frequency layer from a non-serving cell, an actual data transmission and reception of the non-serving cell occurs on a second frequency layer, determining whether the indication satisfies at least one triggering condition to initiate signal scanning on the first frequency layer for identifying the beacon signal transmission from the non-serving cell, scanning, when the received indication satisfies the triggering condition, the first frequency layer for identifying any beacon signal, decoding the beacon signal from the non-serving cell, and receiving assistance information from the serving cell to facilitate identification of the non-serving cell transmitting the beacon signals on the first frequency layer.

35 Claims, 8 Drawing Sheets

(51) Int. Cl.
*H04W 48/16* (2009.01)
*H04W 92/04* (2009.01)
*H04W 48/12* (2009.01)

(56) References Cited

U.S. PATENT DOCUMENTS

| | | | | |
|---|---|---|---|---|
| 8,526,419 B2* | 9/2013 | Tenny | ............... | H04W 24/00 370/350 |
| 8,542,655 B2* | 9/2013 | Kuroda | ............... | H04L 1/0026 370/332 |
| 8,660,559 B2* | 2/2014 | Tamura | ............... | H04W 36/30 455/436 |
| 8,676,208 B2* | 3/2014 | Chou | ............... | H04L 27/0006 455/434 |
| 8,699,467 B2* | 4/2014 | Lindoff | ............... | H04L 5/0053 370/332 |
| 8,824,390 B2* | 9/2014 | Aminaka | ............... | H04W 16/10 370/329 |
| 8,842,634 B2* | 9/2014 | Gomes | ............... | H04W 36/0088 370/328 |
| 8,848,658 B2* | 9/2014 | Gorokhov | ............... | H04W 36/0055 370/331 |
| 9,008,720 B2* | 4/2015 | Yu | ............... | H04W 48/16 370/252 |
| 9,167,504 B2* | 10/2015 | Palanki | ............... | H04W 48/08 |
| 9,179,375 B2* | 11/2015 | Lim | ............... | H04W 36/0066 |
| 9,237,569 B2* | 1/2016 | Lee | ............... | H04W 72/042 |
| 2003/0119550 A1* | 6/2003 | Rinne | ............... | H04W 36/30 455/553.1 |

* cited by examiner

METHOD AND DEVICE FOR DETECTING INTER-FREQUENCY CELL SIGNALS IN A HETEROGENEOUS NETWORK

CROSS-REFERENCE TO RELATED APPLICATION(S)

This application is a U.S. National Stage application under 35 U.S.C. §371 of an International application filed on Mar. 18, 2013 and assigned application number PCT/KR2013/002199, which claimed the benefit of an Indian patent application filed on Mar. 16, 2012 in the Indian Intellectual Property Office and assigned Serial number 981/CHE/2012, the entire disclosure of which is hereby incorporated by reference.

TECHNICAL FIELD

The present disclosure relates to the field of Heterogeneous Networks (HetNet) and related deployment scenarios. More particularly, the present disclosure relates to method and system for identifying inter-frequency cells in a HetNet environment by user equipment (UE) with minimum power consumption of UE battery.

BACKGROUND

The system capacity of an existing macro cell network may be increased by deployment of small cells in the underlying macro network. Such deployment may be a co-channel where the macro cells and the small cells operate on the same frequency. Interference from the macro cell is a major issue for co-channel deployment. When the small cell is operating on another frequency layer differently from the frequency layer on which the macro cells are operating, then identification of the inter-frequency small cells when the user equipment is served by the macro cell is a challenging issue. Further, the network including cells with different sizes and overlapping coverage either on same frequency or different frequency is called as Heterogeneous network (HetNet). The small cells include "pico cells", "femto cells", relay stations and the like.

In an inter-frequency HetNet deployment, in order to support the handover (offloading) of UE from a macro cell on frequency f1 to the overlaid pico cell on frequency f2, certain enhancements may be required. Existing mobility procedures specified in 3rd Generation Partnership Project (3GPP) version of TS 36.331 may involve configuration of measurement gap to identify and measure the inter-frequency cells. The activation of measurement gap is based on s-measure. For example, a time window of 6 milliseconds is configured as a measurement gap for every 40 to 80 milliseconds by the network to the UE to identify inter-frequency cells. However, a threshold signal strength called as "s-measure" is used as a triggering criterion by the UE for activating the configured measurement gap. In a homogeneous network i.e. network having cells of same size the s-measure rule to trigger inter-frequency scans using the configured measurement gaps work well. This is because all the cells have similar coverage and the inter-frequency cells are not overlaid but the overlap occurs only at cell border. It may be perceived as, this method of looking for inter-frequency cells in the HetNet deployment does not work well because the User Equipment (UE) may have to perform the scan (measurement) for inter-frequency cells all the time and the UE is not governed by the s-measure trigger. Hence, from the perspective of UE the method is power consuming and not very efficient.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide the HetNet deployment includes inter-frequency cells of different Radio Access Technology (RAT), the method for identifying these cells need to be efficient and need to be standardized to conserve the User Equipment (UE) battery power consumption.

In accordance with an aspect of the present disclosure, a method for reducing consumption of battery power of UE during inter-frequency cell detection in a Heterogeneous Network (HetNet) is provided. The method includes receiving an indication from a serving cell operating on a first frequency layer about a presence of a beacon signal transmission on the first frequency layer from a non-serving cell, an actual data transmission and reception of the non-serving cell occurring on a second frequency layer, determining whether the received indication satisfies at least one triggering condition to initiate signal scanning on the first frequency layer for identifying the beacon signal transmission from the non-serving cell, scanning, when the received indication satisfies the at least one triggering condition, the first frequency layer for identifying any beacon signal transmission, decoding, when the received indication satisfies the at least one triggering condition, the beacon signal transmission from the non-serving cell, and receiving assistance information from the serving cell to facilitate identification of at least one non-serving cell transmitting the beacon signals on the first frequency layer (f1).

In accordance with another aspect of the present disclosure, a method of assisting identification of inter-frequency cell with reduced battery power consumption for the UE in the HetNet is provided. The method includes transmitting an indication to the UE on the first frequency layer about the beacon signal transmission from a non-serving cell, the non-serving cell actually transmitting and receiving on a second frequency layer, providing assistance information to the UE on the first frequency layer to identify the non-serving cell, the assistance information being provided through one of a dedicated Radio Resource Control (RRC) message and system information broadcast message, evaluating feedback reports from the UE which includes the physical cell identity (PCI) after decoding the beacon signal from a non-serving cell on the first frequency layer, activating the measurement configuration for the second frequency layer if the measurement configuration was previously provided, and configuring, if the measurement configuration was not previously provided, the UE with the measurement configuration for the second frequency layer in order to evaluate for an inter-frequency handover to the non-serving cell.

In accordance with another aspect of the present disclosure, a device for detecting inter-frequency cells in a Heterogeneous Network (HetNet) is provided. The device includes a processor configured to detect inter-frequency cell signals, a memory connected to the processor, the memory configured to store a program that when executed by the processor performs a method of detecting the inter-frequency cell signals, the method includes receiving an indication from a serving cell operating on a first frequency layer about presence of a beacon signal transmission on the first frequency layer from a non-serving cell, the non-serving cell actually transmits and receives data on a second frequency layer along with at least one trigger condition, determining whether the indication satisfies at least one triggering condition to initiate signal scanning at the first frequency layer for identifying the beacon signal transmission from the non-serving cell, scanning, when it is determined that the indication satisfies the at least one triggering condition, the first frequency layer for identifying any beacon signal transmission and decoding the beacon signal transmission from the non-serving cell, and receiving assistance information from the serving cell to facilitate identification of at least one non-serving cell transmitting the beacon signals on the first frequency layer.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure provides method and system for identifying inter-frequency cells in a heterogeneous network. In the following detailed description of the embodiments of the present disclosure, reference is made to the accompanying drawings that form a part hereof, and in which are shown by way of illustration specific embodiments in which the present disclosure may be practiced. These embodiments are described in sufficient detail to enable those skilled in the art to practice the present disclosure, and it is to be understood that other embodiments may be utilized and that changes may be made without departing from the scope of the present disclosure. The present disclosure is applicable to the Evolved Universal Terrestrial Radio Access Network (E-UTRAN) based on Long Term Evolution (LTE) radio access technology (RAT). However, application of the present disclosure in systems based on other RATs is not precluded. The following detailed description is, therefore, not to be taken in a limiting sense, and the scope of the present disclosure is defined only by the appended claims.

In the present document, terms "cell" and "base station" are used interchangeably and they mean one and the same.

Figure 1:
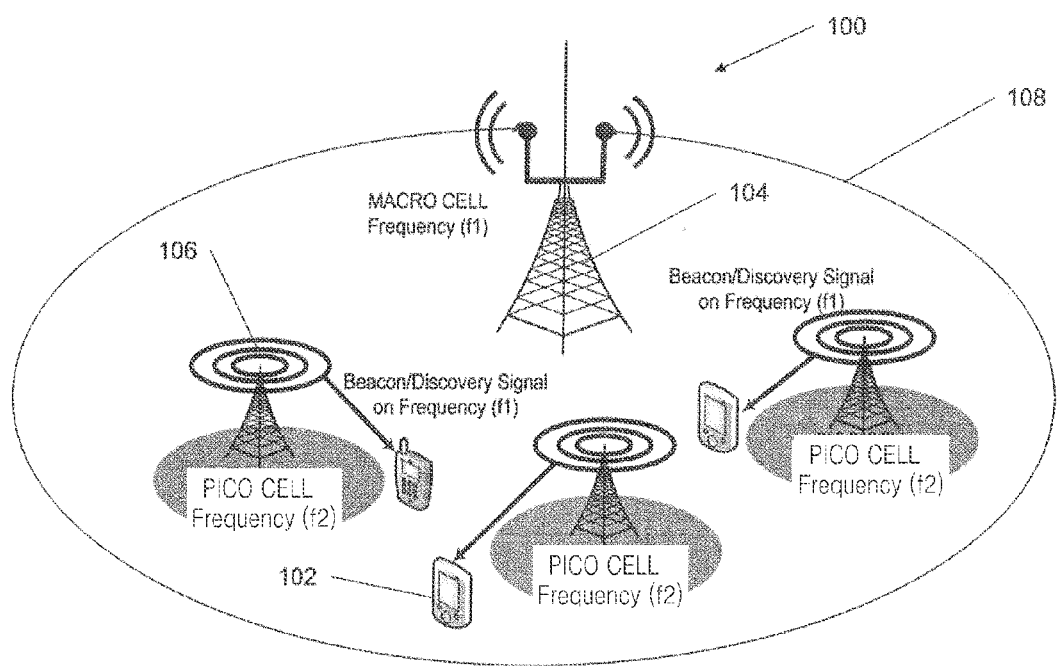
FIG. 1 illustrates a Heterogeneous Network (HetNet) deployment in accordance with an embodiment of the present disclosure.

FIG. 1 illustrates a Heterogeneous Network (HetNet) deployment in accordance with an embodiment of the present disclosure.

Referring to FIG. 1, the HETNET deployment 100 includes a User Equipment (UE) 102 that is connected to a serving cell 104. In accordance with various embodiments of the present embodiment, the serving cell 104 is a macro cell with a cell coverage area 108, communicating on a first frequency layer (f1). Since the UE 102 is performing data communication with the serving cell 104 on the first frequency layer (f1), the first frequency layer (f1) is called the serving frequency. Within the coverage area 108, one or more non-serving cell(s) 106 are overlaid at different locations. For instance, the non-serving cells such as 106 may be small cells like pico cells, femto cells, relay stations and the like. The non-serving cell 106 communicates on a second frequency layer (f2) and hence the non-serving cell 106 may also be called as an "inter-frequency" cell. Since the UE 102 is not connected and not having data communication with the inter-frequency cell 106, the non-serving cell 106 is called non-serving cell and hence the second frequency layer (f2) is called non-serving frequency layer. Further, Radio Access Technology (RAT) of the serving cell 102 and the non-serving cell(s) 106 may be either different or same. For illustration, it may be assumed that the serving cell 104 and the non-serving cell(s) are based on LTE RAT. The terms "small cell", "non-serving cell" and "inter-frequency cell" are used interchangeably throughout the disclosure.

It is known to the serving cell 104 that the non-serving cell 106 is transmitting beacon or discovery signals on the first frequency layer (f1) to facilitate the UE 102 in discovering the non-serving cell 106. It is also known to the serving cell 104 that the non-serving cells 106 transmitting beacon signals on the first frequency layer (f1) are having actual data transmission and reception on the second frequency layer (f2). In various embodiments of the present disclosure, operations are provided towards identification of such non-serving cells 106 operating on a non-serving frequency by transmitting beacon signals on the serving frequency. The beacon signal is transmitted on a physical layer channel called discovery channel.

Figure 2A:
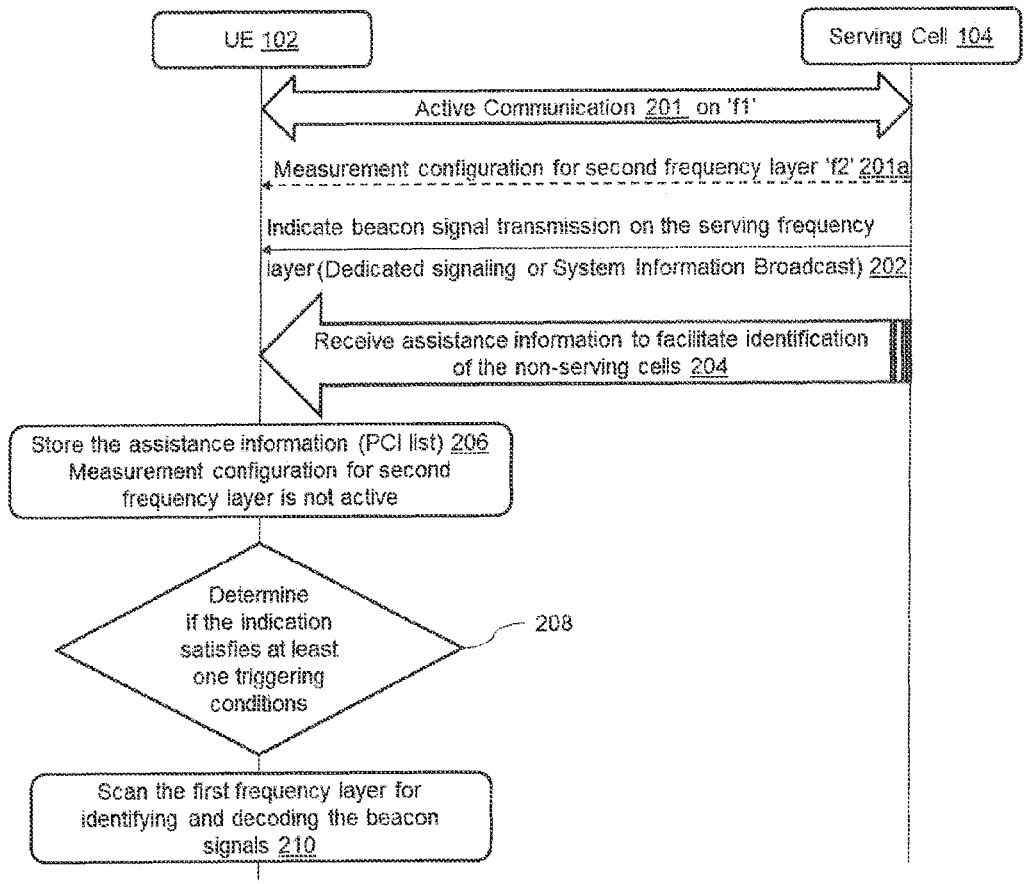
FIG. 2A illustrates a method for reducing consumption of battery power of User Equipment (UE) during inter-frequency cell detection in a HetNet in accordance with an embodiment of the present disclosure.

FIG. 2A illustrates a method for reducing consumption of battery power of User Equipment (UE) during inter-frequency cell detection in a Heterogeneous Network (HetNet) in accordance with an embodiment of the present disclosure.

Referring to FIG. 2A, the method includes plurality of steps following a procedure to identify the non-serving cell 106 transmitting beacon signals on the serving frequency layer (f1). The UE 102 and the serving cell 104 have an active communication session existing, as denoted in operation 201. Further, in operation 201a, optionally, the UE 102 may be configured with measurement configuration for the second frequency layer (f2). However, the measurement configuration for the second frequency layer (f2) is not activated by the UE 102. In operation 202, the serving cell 104 indicates the presence of transmission of beacon signals to the UE 102 on the first (serving) frequency layer (f1). The indication may be provided through a dedicated signaling or through system information broadcast message. Along with the indication in operation 204, the UE receives assistance information from the serving cell 104 to facilitate the detection of beacon signals from the non-serving cell 106. In an embodiment, the assistance information includes the list of PCI reserved for the non-serving cell(s) 106 and the sub-frame offset where the beacon signal is expected to be transmitted by the non-serving cell 106. In operation 206, the assistance information provided by the serving cell 104 is stored at the UE 102. It may be noted that the measurement configuration for the second frequency layer (f2) is not active. In operation 208, the UE 102 determines whether at least one of triggering conditions for starting scanning of the beacon signal on the first frequency layer (f1) is satisfied. There are different triggering conditions such as mobility state estimate (MSE), energy detection of the beacon signal, proximity of the non-serving cell 106, and more which may be apparent to those skilled in the art and from the disclosure provided. For example when the MSE of UE 102 is medium or low, the MSE may be considered as one of the trigger for beacon scanning. Thereafter, the UE 102 scans for identification of the beacon signals transmitting on the serving frequency layer (f1). It is to be noted that since the UE 102 is having data communication with serving cell 104 on the serving (first) frequency layer (f1), the power consumption for scanning the beacon signals on the first frequency layer (f1) is negligible.

Figure 2B:
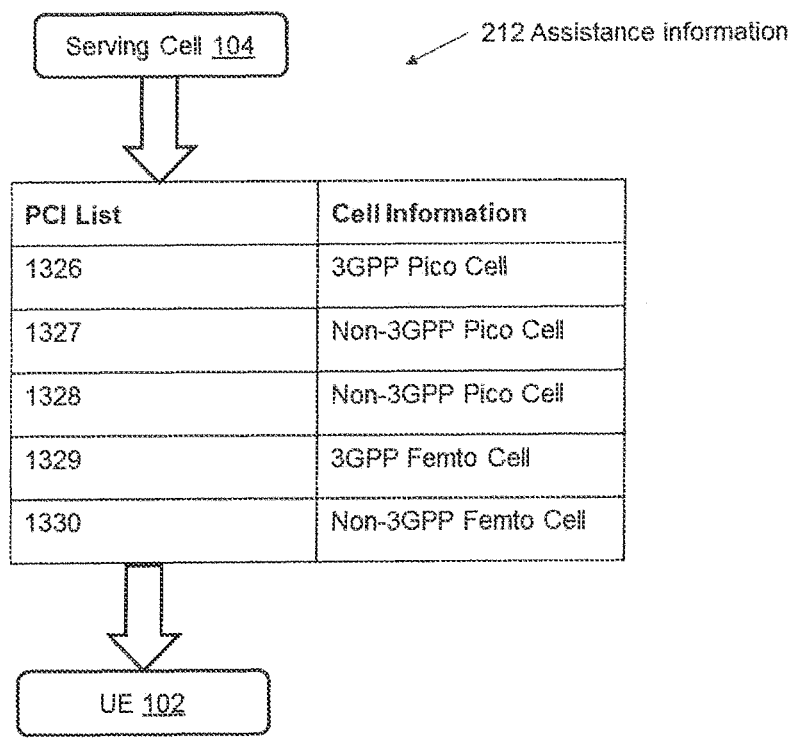
FIG. 2B illustrates a method of identifying the type of a non-serving cell in accordance with an embodiment of the present disclosure.

FIG. 2B illustrates a method of identifying the type of a non-serving cell in accordance with an embodiment of the present disclosure.

Referring to FIG. 2B, the UE 102 scans for beacon signal identification on the serving frequency layer (f1). On identifying the beacon signals, the UE 102 decodes the beacon from the signal samples of one or more sub-frames. On decoding the beacon signal, the UE 102 identifies the Physical Cell Identity (PCI) used by the non-serving cell 106 to transmit the beacon signal. PCI is a code through which the cell is uniquely identified and PCI is well defined in the 3rd Generation Partnership Project (3GPP) specification. In the assistance information provided in operation 204 of FIG. 2A, the UE 102 received a list of PCIs. The PCIs in the list is reserved for non-serving cells or small cells or inter-frequency cells transmitting beacon signals on the serving frequency layer (f1). This may imply that the PCI in the list provided as assistance information shall not be used by macro cells in the HetNet. In an embodiment, the PCI list is reserved according to the type of the cell as shown in FIG. 2A. The type of the non-serving cell 106 may include pico cell, femto cell, relay stations and the like. By comparing the identified PCI from decoding the beacon signal with the list of PCIs provided in the assistance information from the serving cell 104, the UE 102 determines the non-serving cell 106 is an inter-frequency cell. Further the UE 102 may also determine the Radio Access Technology (RAT) of the non-serving cell 106 based on the reserved PCI list. Examples of the types of RATs include Global System for Mobile (GSM), High Speed Packet Access (HSPA), and Universal Mobile Telecommunications System (UMTS) and the like. The non-serving cell 106 may also belong to non-3GPP TAT like Code Division Multiple Access (CDMA), WiMAX and the like. The assistance information is received either through the dedicated signaling or through the system information broadcast.

Figure 2C:
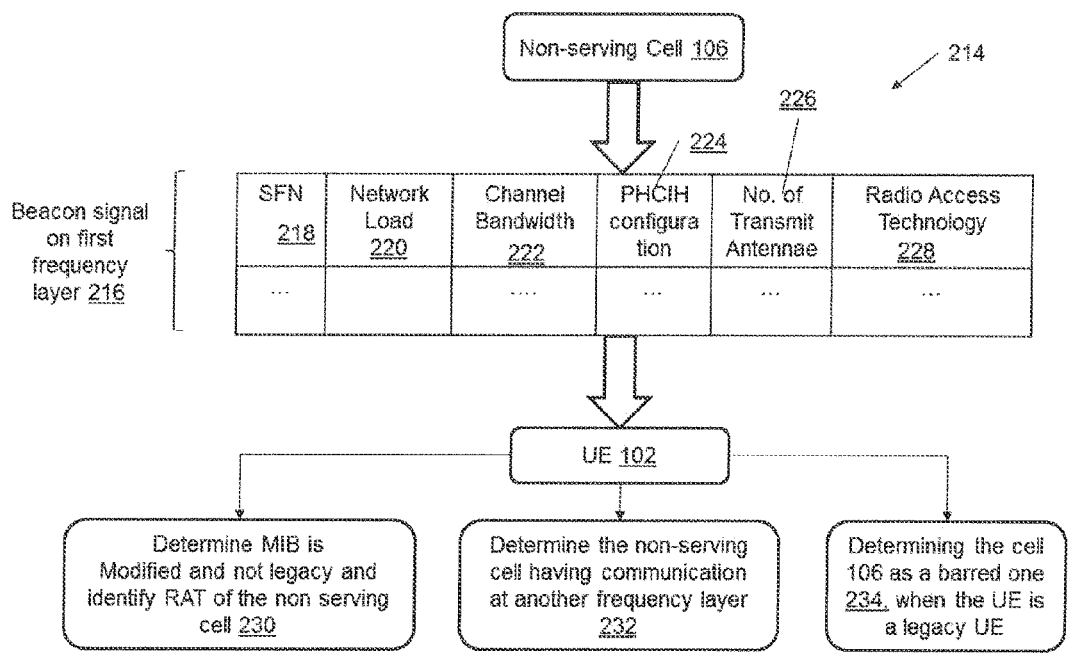
FIG. 2C illustrates an alternate method of identifying the type of a non-serving cell in accordance with an embodiment of the present disclosure based on decoding of Master Information Block (MIB).

FIG. 2C illustrates an alternate method of identifying the type of a non-serving cell in accordance with an embodiment of the present disclosure based on decoding of Master Information Block (MIB).

Referring to FIG. 2C, after decoding the beacon signal on serving frequency (f1) the UE 102 identifies the PCI of the non-serving cell 106. In the method, the beacon signal (channel) also includes other information apart from the PCI. In the present embodiment, a Master Information Block (MIB) 214 is transmitted in the beacon channel. In one embodiment, the MIB 214 includes a plurality of information fields such as a System Frame Number (SFN) 218, the load information of non-serving cell 106 on 'f2' 220, channel bandwidth information 222, PHCIH configuration 224, number of transmit antennae 226, the RAT information 228, and the like. Based on the MIB 214 received through the beacon channel, the UE 102 may determine whether the received MIB 214 is a modified MIB or legacy MIB at operation 230. Since the UE 102 determined the received MIB 214 is a modified MIB, the UE 102 identifies the detected non-serving cell 106 is an inter-frequency cell at operation 232. The UE 102 determines that the detected non-serving cell 106 as a barred one when the channel bandwidth field is set to zero or absent. In this example, the UE 102 is a legacy UE and hence the modified MIB cannot be read by the legacy UE at operation 234.

Figure 3A:
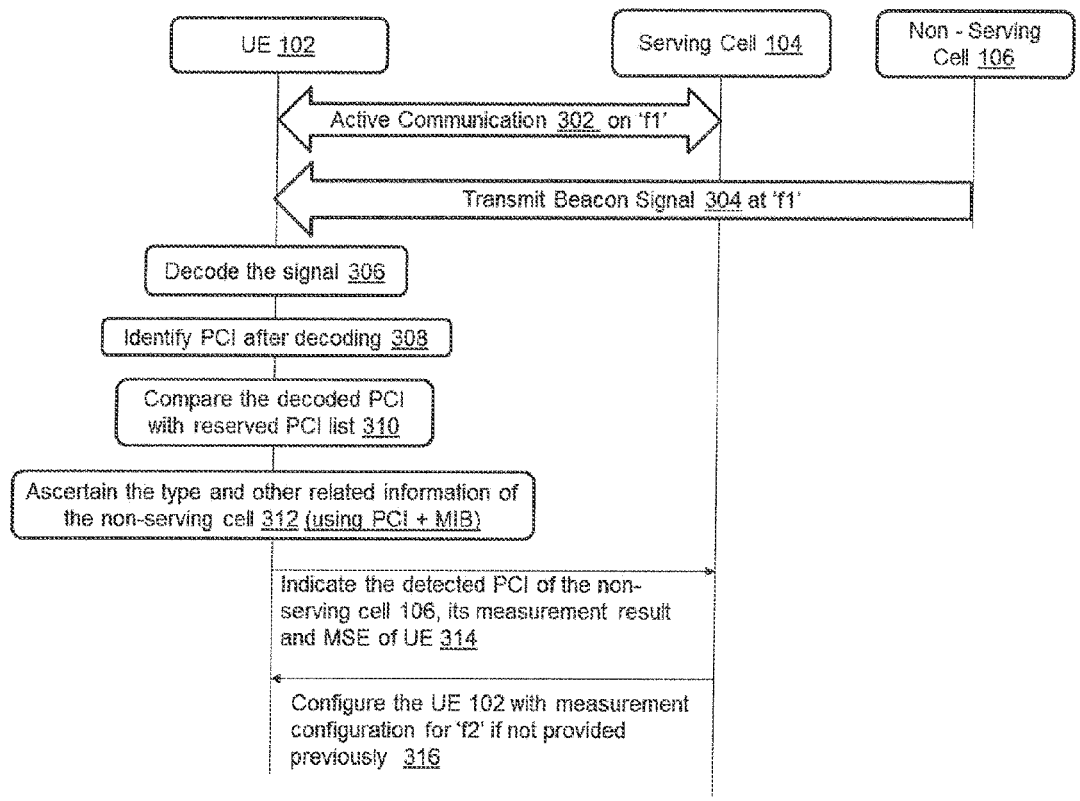
FIG. 3A illustrates one or more steps performed at the UE when a beacon signal is decoded in accordance with an embodiment of the present disclosure.

FIG. 3A illustrates one or more steps performed at the UE when a beacon signal is decoded in accordance with an embodiment of the present disclosure.

Referring to FIG. 3A, the serving cell 104 and the UE 102 have an on-going communication session, denoted by operation 302 on the first frequency layer (f1). In operation 304, the beacon signal is transmitted from the non-serving cell 106 on the first frequency layer (f1). The UE 102 decodes the beacon signal to obtain required information in operation 306. Thereafter, on decoding the beacon signal information such as PCI and MIB are obtained from the beacon signal by the UE 102, in operation 308. In operation 310, the obtained information, the detected PCI is compared with stored list of PCI (present in assistance information) provided by the serving cell 104. Thereafter, type of the cell, type of the RAT, and other information are ascertained in operation 312 using the PCI related information and the MIB.

In an expansive embodiment, the UE 102 decodes the beacon signal from non-serving cell 106 by applying interference cancellation of Primary Signal Synchronization (PSS) and Secondary Signal Synchronization (SSS) of the serving cell 104. The cancellation of PSS and SSS is performed by the UE 102 to remove the interference of the serving cell 104 to the beacon. In another embodiment, to protect the beacon signals on the first frequency layer (f1), the serving cell 104 performs a Physical Downlink Shared Channel (PDSCH) resource element muting for the resources that overlap with the beacon signals. Further, in another embodiment, the PDSCH resource element muting performed by the serving cell 104 is based on the sub-frame offset during beacon signal transmission negotiated by the non-serving cell 106 with the serving cell 104 on the X2 interface. The sub-frame offset where the non-serving cell 106 transmits the beacon signal on the first frequency layer (f1) is signaled to the UE 102 by the serving cell 104 as part of the assistance information. Further, in an embodiment in order to reduce power consumption at the UE 102, the non-serving cell 106 transmits the beacon signal on the first frequency layer (f1) during the ON duration of the DRX cycle configured to the UE 102 by the serving cell 104.

After ascertaining the detected non-serving cell 106 as an inter-frequency cell, the UE 102 indicates to the serving cell 104 about the decoded PCI of the non-serving cell 106 in operation 314. Along with the detected PCI, measurement result for the non-serving cell 106 on the first frequency layer (f1) is also reported to the serving cell 104. In an embodiment this reporting is done using either the measurement report message or proximity indication message or any other RRC message. Further, in an expansive embodiment, the UE 102 based on the stored information fields of the received modified MIB, like SFN and the number of transmit antennae may identify the Cell-Specific Reference Signal (CRS) resources used for transmission of the beacon signal by the non-serving cell 106. These information fields in the MIB 214 as illustrated in FIG. 2C is used to identify the CRS resources for transmitting the beacon signal. The UE 102 may also perform Reference Signal Received Power (RSRP) and Reference Signal Received Quality (RSRQ) measurements of the detected non-serving cell 106 on the identified CRS resources used for the beacon signal transmission on the first frequency layer (f1).

In one or more embodiments, the UE 102 facilitates the proximity estimation of the non-serving cell 106 by sending Reference Signal Received Power (RSRP) and/or Reference Signal Received Quality (RSRQ) measurement result of the non-serving cell 106 on the first frequency layer (f1) through a proximity indication message or a dedicated RRC message along with the mobility state estimate (MSE) of the UE 102.

In one embodiment, the UE 102 continuously reports measurement result of the non-serving cell 106 on the first frequency layer (f1) to the serving cell 104 until the serving cell 104 configures the measurement configuration for "f2" to the UE 102, if not previously configured in one of the operations of FIG. 2A. In another embodiment, the serving cell 104 configures the UE 102 with the measurement configuration in operation 316, based on the first feedback report from the UE in operation 314. If not, the transmission of measurement results is repeated until the serving cell 104 configures the UE 102 with measurement configuration based on the reported measurement results for the non-serving cell 106.

The measurement configuration comprises of a measurement identity, a measurement object, a measurement reporting configuration and measurement gap configuration. The measurement identity element identifies a measurement, linking a measurement object and a reporting configuration. The measurement object is specific to a frequency configured for measurement. In operation 226 the UE is configured with measurement object for the second frequency layer (f2). The second frequency layer (f2) is the frequency of actual data communication for the reported non-serving cell 106. The measurement object may also include a list of cells for which configuration parameters are set to a specific value on the frequency specified by measurement object. The measurement reporting configuration specifies when the UE 102 should trigger a measurement report as well as which measurement result the UE 102 shall include in the measurement report. A measurement report may be triggered in case a particular 'event condition' is fulfilled (e.g. a non-serving cell becomes a certain offset better than the current serving cell (event A3)). The measurement configuration is known in the art.

Figure 3B:
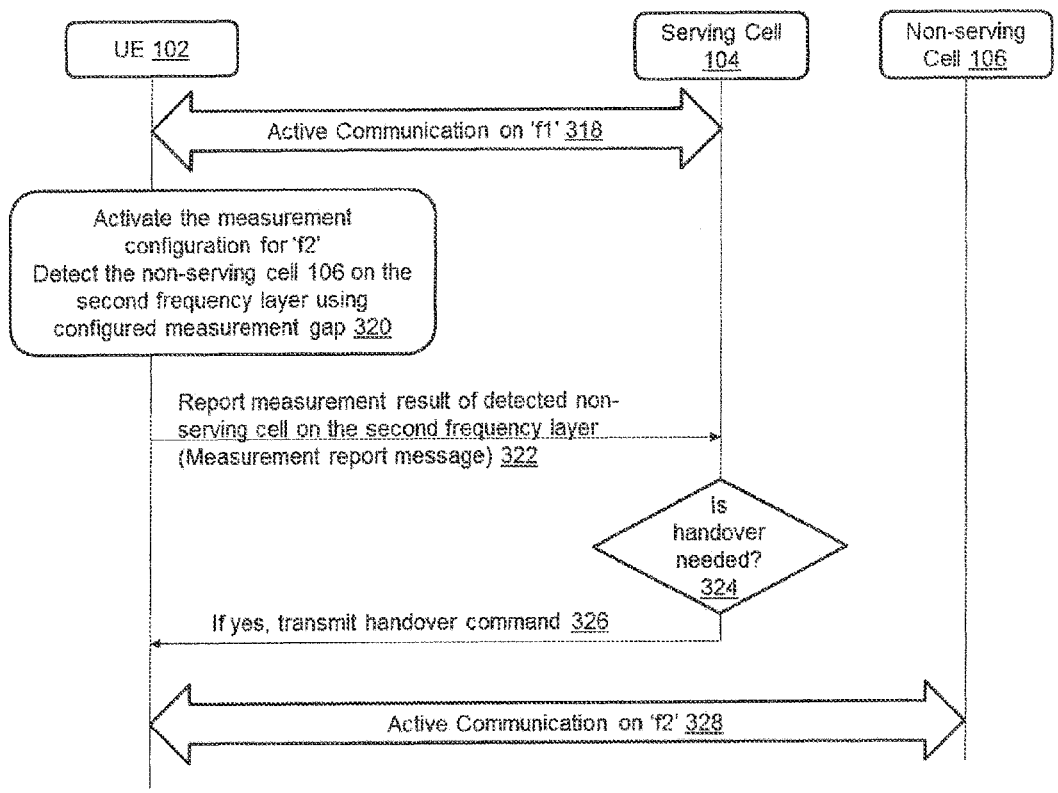
FIG. 3B illustrates a condition of performing handover in accordance with a method of various embodiments of the present disclosure.

FIG. 3B illustrates a condition of performing handover in accordance with a method of various embodiments of the present disclosure.

Referring to FIG. 3B, the UE 102 and the serving cell 104 are in active communication, as denoted in operation 318. If the measurement configuration is previously provided for the second frequency layer (f2) in one of the operations of FIG. 2A, the UE 102 activates the measurement configuration for second frequency layer (f2) locally and starts scanning for the non-serving cell 106 on second frequency layer (f2). The UE 102, subsequently, terminates the scan for the beacon signal on the first frequency layer (f1). If not, after the UE 102 gets configured with the measurement configuration for the second frequency layer "f2" by the serving cell 104 in operation 226, the UE 102 terminates the scan for the beacon signal on the first frequency layer (f1). Thereafter, scanning for the non-serving cell 106 on the second frequency layer (f2) using the configured measurement gap is initiated by the UE 102.

In operation 320, the UE 102 first detects the non-serving cell 106 on the second frequency layer (f2) using the configured measurement gap provided by the serving cell 104. After detection of the non-serving cell 106, the UE 102 performs RSRP and/or RSRQ measurements for the non-serving cell 106 on the second frequency layer (f2) according to the configured measurement object in operation 322. The measurement result for the non-serving cell 106 on the second frequency layer (f2) is reported to the serving cell 104 based on the configured reporting configuration in operation 316 as shown in FIG. 3A. In one embodiment, the measurement results for the non-serving cell 106 on the second frequency layer (f2) are reported by the UE 102 through a measurement report message or a dedicated RRC message. The serving cell 104 determines in operation 324 whether handover is needed to the reported non-serving cell 106 based on the reported measurement results. If yes, in operation 326, the serving cell transmits a handover command to the UE 102 to shift the active communication from the serving cell 104 on the first frequency (f1) to the non-serving cell 106 on the second frequency layer (f2). The normal handover procedure is followed for this inter-frequency handover and the UE 102 establishes active communication with the reported non-serving cell 106 on the second frequency layer (f2). When the UE 102 establishes active communication with non-serving cell 106 on second frequency layer (f2) in operation 328, the non-serving cell 106 becomes the serving cell and the previous serving cell 104 becomes the non-serving cell. The normal handover procedure is apparent to those skilled in the art.

Figure 4:
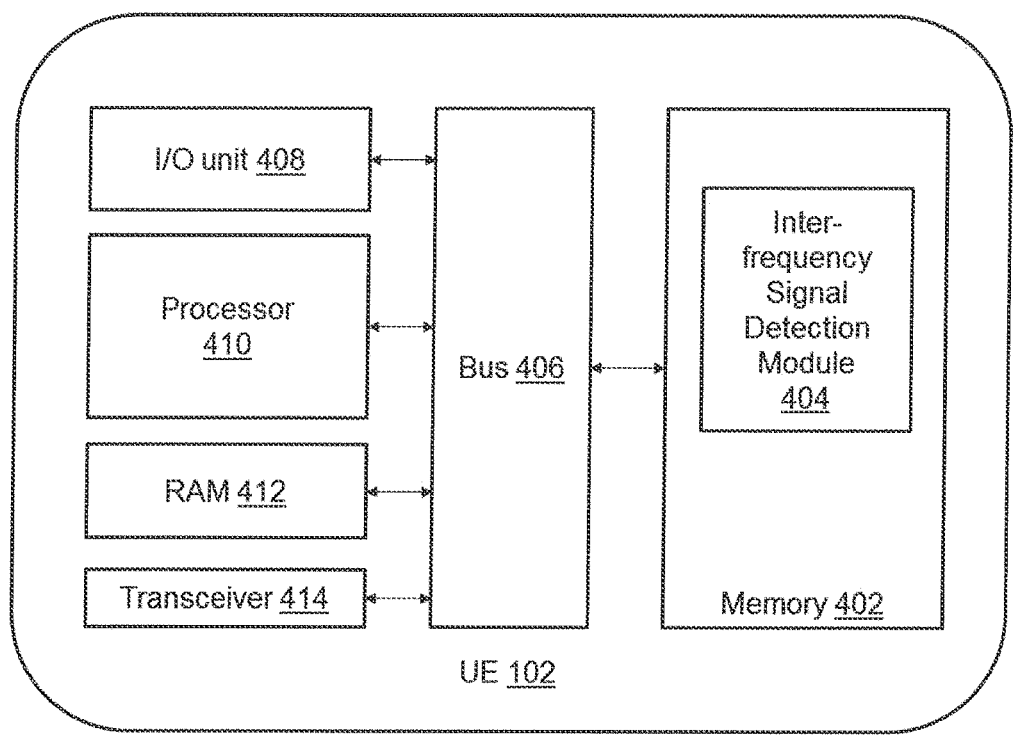
FIG. 4 is a block diagram of the UE in accordance with an embodiment of the present disclosure.

FIG. 4 is a block diagram of a device in accordance with an embodiment of the present disclosure.

Referring to FIG. 4, a device is called a User Equipment (UE) 102 in accordance with industrial terminology. The terms UE and device may be used interchangeably.

The UE 102 includes a memory 402 including an inter-frequency signal detection module 404, a bus 406, an Input/

Output (I/O) Unit 408, a processor 410, a Random Access Memory (RAM) 412, and a transceiver 414.

The memory 402 may be volatile memory and non-volatile memory. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks™, and the like.

The inter-frequency signal detection module 404 in the memory 402 is capable of assisting the UE 102 in performing all the operations of FIGS. 2A, 2B, 2C, 3A and 3B. The inter-frequency signal detection module 404 is configured to manage operations related to detecting beacon signals from the non-serving base stations such as 106 in accordance with various embodiments of the present disclosure.

The processor 410 as used herein, is any type of computational circuit, such as, but not limited to, a microprocessor, a microcontroller, a complex instruction set computing microprocessor, a reduced instruction set computing microprocessor, an explicitly parallel instruction computing microprocessor, a graphics processor, a digital signal processor, or any other type of processing circuit. The processor 410 may also include embedded controllers, such as generic or programmable logic devices or arrays, application specific integrated circuits, single-chip computers, smart cards, and the like.

The other components of the UE 102 such as the bus 406, the RAM 412, and the transceiver 414 are known to the person skilled in the art and hence, their explanation is forfeited.

Figure 5:
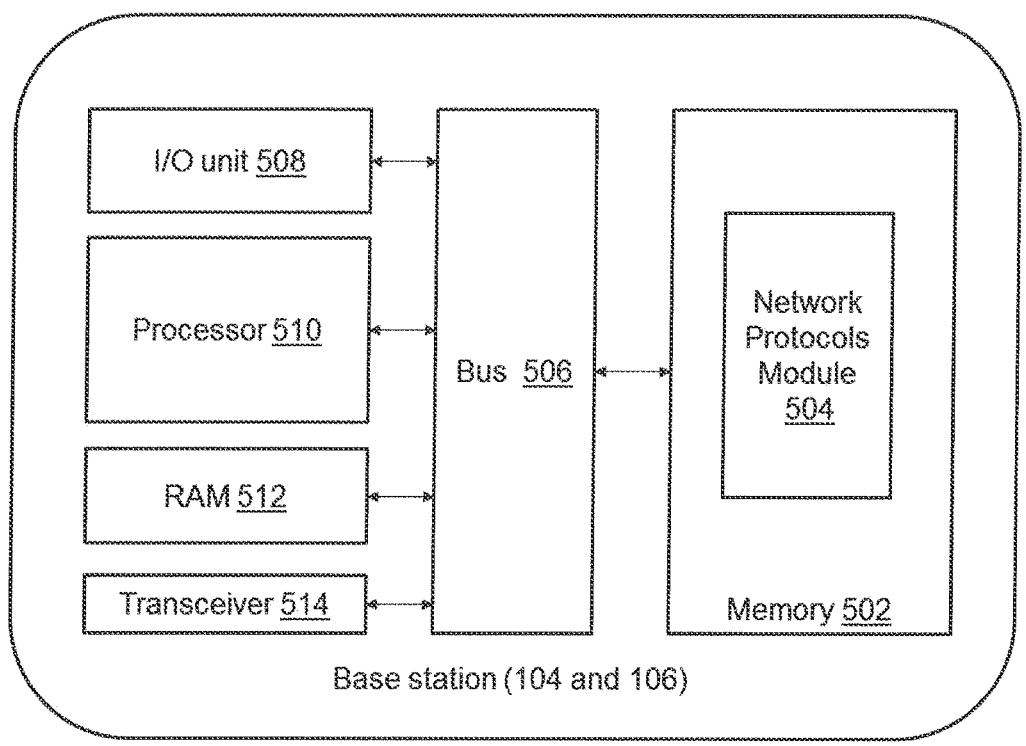
FIG. 5 is a block diagram of a base station in accordance with an embodiment of the present disclosure.

FIG. 5 is a block diagram of a base station in accordance with an embodiment of the present disclosure.

Referring to FIG. 5, the serving cell 104 and the non-serving cell 106 may alternatively be called base stations in accordance with industry terminology. The serving cell 104 and non-serving cell 106 include memory 502 configured with the network protocols module 504, a bus 506, an Input/Output (I/O) unit 508, a processor 510, a RAM 512, a transceiver 514.

The network protocols module 504 is configured with set of predefined actions to be followed for different kinds of messages to/from the UE 102 and/or the non-serving cell 106. The network protocols module 504 may be configured in concordance with the programs of the inter-frequency signal detection module 404.

The signaling communication between the base station 104 and the non-serving base station 106 happens over an X2 interface. In one embodiment, the load information is shared through the X2 interface for the non-serving base station 106 operating on the second frequency layer (f2) with the serving base station 104 operating on the first frequency layer (f1). The load information may refer to the number of UEs that are currently being handled by a base station. The serving cell 104 determines that the load in the non-serving cell 106 is high. Consequently, the serving cell 104 transmits a command through an 'X2' interface to the non-serving serving cell 106 to turn off the beacon signal transmission on the first frequency layer (f1). Also, the serving cell 104 transmits the command of stopping beacon signal scanning to the UE 102 by being aware of the load conditions of the non-serving cell 106 on the second frequency layer (f2).

The serving cell 104 exchanges message with the non-serving cell 106 on the X2 interface for allocation of resources for beacon signal transmission on the first frequency layer (f1) to protect the beacon signal transmission from interference from the serving base station 104. For example, a time shared pattern could be adopted by the serving base station 104 by negotiating with the non-serving cell 106 for allocating resources in sub-frames accordingly for the beacon signal transmission.

In another embodiment, the serving cell 104 may provide transmit power commands on the X2 interface to the non-serving cell 106 by stepping up or stepping down the signal transmission magnitude for the beacon signal transmission. The power commands determined by the base station 104 based on the perceived interference on the resources allocated for beacon signal transmission by the non-serving cell 106.

In yet another embodiment, the serving cell 104 sends an indication over an X2 interface to the non-serving cell 106 to stop transmission of the beacon signals on the first frequency layer (f1), when there is a possibility of high interference on the beacon signal from the transmission of serving cell on the first frequency layer (f1) there is inability of the serving cell on the first frequency layer (f1) to reserve resources for the protection of the transmission of the beacon signal from the non-serving cell; and the load in the non-serving cell for the second frequency layer (12) is high.

The components of the serving cell 104 such as the memory 502, the processor 510, the bus 506, the Input/Output (I/O) unit 508, the RAM 512, and the transceiver 514 are known to the person skilled in the art.

While the present disclosure has been described with reference to various embodiments, it will be understood by those skilled in the art that various changes in form and details may be made therein without departing from the spirit and scope of the present disclosure as defined by the appended claims and their equivalents.

The invention claimed is:

1. A method for reducing consumption of battery power of a user equipment (UE), the method comprising:
   receiving an indication from a serving cell operating on a first frequency layer, the indication indicating a presence of a beacon signal transmission on the first frequency layer from a non-serving cell, and an actual data transmission and reception of the non-serving cell occurring on a second frequency layer along with at least one trigger condition;
   determining whether the received indication satisfies the at least one triggering condition;
   if the received indication satisfies the at least one triggering condition, scanning the first frequency layer for identifying any beacon signal transmission and
   decoding the beacon signal transmission from the non-serving cell; and
   receiving assistance information from the serving cell to facilitate identification of the non-serving cell transmitting the beacon signal on the first frequency layer.

2. The method in accordance with claim 1, wherein the beacon signal from the non-serving cell comprises a physical cell identity (PCI), and
   wherein the method further comprises determining, upon decoding the PCI, a type of the non-serving cell and that the non-serving cell actually transmits and receives data on the second frequency layer.

3. The method in accordance with claim 2, wherein the determining of the type of the non-serving cell and that the non-serving cell actually transmits and receives data on the second frequency layer, further comprises:
   comparing the decoded PCI with a list of PCIs provided in the assistance information.

4. The method in accordance with claim 2, wherein the determining of the type of the non-serving cell further comprises:
   determining if the non-serving cell belongs to at least one of 3GPP radio access technology (RAT) and a non 3GPP RAT based on the assistance information received from the serving cell.

5. The method in accordance with claim 4, wherein the determining if the type of the non-serving cell is the non-3GPP RAT further comprises:
   comparing the PCI obtained from decoding the beacon signals from the non-serving cell with the assistance information received from the serving cell,
   wherein the assistance information comprise a list of PCIs reserved for cells belonging to the non-3GPP RAT.

6. The method in accordance with claim 1, wherein the beacon signal from the non-serving cell comprises a master information block (MIB), which is decoded in order to identify at least one of channel bandwidth and that a field in the MIB is set to value zero or the field is not present, and to provide at least one result of:
   determining that the non-serving cell transmitting beacon signals on the first frequency layer actually transmits and receives data on the second frequency layer; and
   declaring that the non-serving cell transmitting beacon signals on the first frequency layer as a barred one, if the UE being a legacy UE.

7. The method in accordance with claim 6, wherein the determining of the non-serving cell transmitting beacon signals on the first frequency layer actually transmits and receives data on the second frequency layer further comprises:
   determining if the non-serving cell belongs to at least one of 3GPP radio access technology (RAT) and non 3GPP RAT based on fields in the MIB.

8. The method in accordance with claim 7, wherein the determining if the non-serving cell belongs to at least one of 3GPP RAT and non-3GPP RAT based on the fields in the MIB further comprises:
   checking a RAT field in the MIB received after the decoding of the beacon signals from the non-serving cell on the first frequency layer.

9. The method in accordance with claim 6, wherein the MIB comprises at least one field, a system frame number (SFN), channel bandwidth, value of number of transmit antennae, type of radio access technology (RAT) of the non-serving cell and network load of the non-serving cell for the second frequency layer.

10. The method in accordance with claim 9, wherein the SFN and the value of the number of transmit antennae are used to identify common reference signal (CRS) resources for performing at least one of signal strength measurements and signal quality measurements of the non-serving cell for the first frequency layer.

11. The method in accordance with claim 1, wherein the indication is received from the serving cell through one of a dedicated radio resource control (RRC) message and system information broadcast message.

12. The method in accordance with claim 1, wherein the receiving of the assistance information from the serving cell to facilitate identification of the non-serving cells operating on the first frequency layer further comprises receiving the assistance information through one of a dedicated radio resource control (RRC) message and system information broadcast message, and
   wherein the assistance information comprise at least one of a list of physical cell identities (PCIs) that are reserved for the non-serving cells for the beacon signal transmission on the first frequency layer and sub-frame offset where the beacon signal is transmitted.

13. The method in accordance with claim 1, further comprising storing the assistance information received from the serving cell for determining a type of the non-serving cell.

14. The method in accordance with claim 1, further comprising improving identification of the beacon signals transmitted from the non-serving cell on the first frequency layer by applying one of interference cancellation techniques of primary signal synchronization (PSS), secondary signal synchronization (SSS) and physical broadcast channel (PBCH) of the serving cell.

15. The method in accordance with claim 1, wherein the assistance information comprises information about sub-frame offset in radio transmission frame, and
   wherein the assistance information provides a location of the beacon signals in radio transmission from the non-serving cell.

16. The method in accordance with claim 1, further comprising:
   reporting identification of the non-serving cell transmitting and receiving the actual data on the second frequency layer to the serving cell, the reporting of the identification of the non-serving cell being transmitted through at least one of a proximity indication message and dedicated radio resource control (RRC) message to the serving cell;
   indicating the physical cell identity (PCI) detected after decoding of the beacon signals from the non-serving cell on the first frequency layer; and
   activating a measurement configuration for the second frequency layer if the measurement configuration is provided previously.

17. The method in accordance with claim 16, wherein the reporting of the identification of the non-serving cell transmitting and receiving the actual data on the second frequency layer further comprises:
   performing at least one of signal strength measurements and signal quality measurements on radio resources allocated for common reference signal (CRS) on the first frequency layer;
   reporting to the serving cell at least one of the measurement result of the non-serving cell on the first frequency layer, mobility state estimate (MSE) of the UE and load information of the non-serving cell for the second frequency layer; and
   facilitating the serving cell with proximity estimation of the UE towards the non-serving cell.

18. The method in accordance with claim 16, further comprising:
   configuring the UE with measurement gap using the measurement configuration for the second frequency layer if the measurement configuration is not previously provided;
   activating the measurement configuration for the second frequency layer and terminating scan for the beacon signal on the first frequency layer;
   scanning on the second frequency layer using the configured measurement gap;
   detecting the non-serving cell on the second frequency layer whose PCI was reported previously; and
   reporting to the serving cell, inter-frequency measurement results of the non-serving cell comprising at least one of signal strength measurements and signal quality measurements for evaluation of inter-frequency handover.

19. The method in accordance with claim 16, further comprising:
continuously performing at least one of signal strength measurements and signal quality measurements on the first frequency layer of the non-serving cell if the measurement configuration for the second frequency layer is not previously provided; and
reporting results of the measurements to the serving cell until a measurement gap is configured.

20. A method of assisting identification of inter-frequency cell with reduced battery power consumption for a user equipment (UE), the method comprising:
transmitting an indication and at least one trigger condition to the UE on a first frequency layer, about the indication indicating a beacon signal transmission from a non-serving cell, and the non-serving cell actually transmitting and receiving data on a second frequency layer;
providing assistance information to the UE on the first frequency layer to identify the non-serving cell, the assistance information being provided through one of a dedicated radio resource control (RRC) message and system information broadcast message;
evaluating feedback reports from the UE after decoding the beacon signal on the first frequency layer from the non-serving cell;
activating a measurement configuration for the second frequency layer if the measurement configuration was previously provided; and configuring, if the measurement configuration was not previously provided, the UE with the measurement configuration for the second frequency layer in order to evaluate for an inter-frequency handover to the non-serving cell.

21. The method in accordance with claim 20, wherein the assistance information comprises at least one of a list of physical cell identities (PCIs) that are reserved for the non-serving cells and sub-frame offset information which provides location of the beacon signal in radio transmission from the non-serving cell on the first frequency layer, the sub-frame offset information which provides location of the beacon signals in the radio transmission from the non-serving cell on the first frequency layer is negotiated between the serving cell and the non-serving cell over an X2 interface.

22. The method in accordance with claim 21, wherein a reservation of the PCIs is done for the non-serving cells transmitting beacon signals on the first frequency layer and having actual data transmission and reception on the second frequency layer.

23. The method in accordance with claim 20, further comprising configuring the UE with measurement configuration comprising a measurement object for the second frequency layer to apply whenever the beacon signal from the non-serving cell is decoded and a physical cell identity (PCI) is reported along with measurement results for the first frequency layer.

24. The method in accordance with claim 20, further comprising:
sending an indication over an X2 interface to the non-serving cell to stop transmission of the beacon signals on the first frequency layer, in accordance with at least one of:
if there is a possibility of high interference on the beacon signal from the transmission of serving cell on the first frequency layer;
if there is an inability of the serving cell on the first frequency layer to reserve resources for the protection of the transmission of the beacon signal from the non-serving cell; and
if a load in the non-serving cell for the second frequency layer is high.

25. The method in accordance with claim 20, wherein evaluating feedback report from the UE after decoding the beacon signal on the first frequency layer from the non-serving cell further comprises:
receiving a measurement report from the UE comprising a physical cell identity (PCI) of the non-serving cell and an inter-frequency measurement result of the non-serving cell for the second frequency layer comprising at least one of signal strength measurements and signal quality measurements; and
configuring the UE with measurement configuration for the second frequency layer if the measurement configuration is not previously provided, the measurement configuration comprising measurement object for the second frequency layer and a measurement gap to scan for the reported non-serving cell on the second frequency layer.

26. The method in accordance with claim 25, wherein, if the serving cell does not configure the UE based upon a first feedback report from the UE, the serving cell continues transmission of the measurement report until the serving cell configures the UE with the measurement configuration based on the measurement report for the non-serving cell.

27. The method in accordance with claim 20, further comprising protecting the beacon signal on the first frequency layer by applying physical downlink shared channel (PDSCH) muting on the first frequency layer of resources of the serving cell overlapping with resources where the beacon signal is transmitted from the non-serving cell.

28. The method in accordance with claim 20, further comprising configuring the UE with a discontinuous reception (DRX) cycle on the first frequency layer such that the beacon signal from the non-serving cell occurs during on-duration of the DRX cycle.

29. A device for detecting inter-frequency cells, comprising:
a processor configured to detecting inter-frequency cell signals;
a memory connected to the processor, the memory configured to store a program executed by the processor performs a method for detecting the inter-frequency cell signals, the method comprising:
receiving an indication from a serving cell operating on a first frequency layer, the indication indicating a presence of a beacon signal transmission on the first frequency layer from a non-serving cell, and an actual data transmission and reception of the non-serving cell occurring on a second frequency layer along with at least one trigger condition;
determining whether the indication satisfies the at least one triggering condition;
if it is determined that the indication satisfies the at least one triggering condition, scanning the first frequency layer for identifying any beacon signal transmission and decoding the beacon signal transmission from the non-serving cell; and
receiving assistance information from the serving cell to facilitate identification of the non-serving cell transmitting the beacon signal on the first frequency layer.

30. The device as recited in claim 29, wherein the beacon signal from the non-serving cell comprises a physical cell identity (PCI), and a transceiver decodes the PCI, wherein the method further comprises determining a type of the non-serving cell and that the non-serving cell actually transmits and receives data on the second frequency layer.

31. The device as recited in claim 30, wherein the determining of the type of the non-serving cell and that the non-serving cell actually transmitting and receiving data on the second frequency layer further comprises comparing the decoded PCI with a list of PCIs provided in the assistance information.

32. The device as recited in claim 30, further comprising determining, if the type of the non-serving cell is determined, whether the non-serving cell belongs to at least one of a 3GPP radio access technology (RAT) and a non 3GPP RAT based on the assistance information received from the serving cell by comparing the PCI obtained from decoding the beacon signals from the non-serving cell with the assistance information received from the serving cell, the assistance information comprise a list of PCIs reserved for cells belonging to the 3GPP RAT and non-3GPP RAT.

33. The device as recited in claim 30, wherein the beacon signal from the non-serving cell comprises a master information block (MIB), the method further comprising:
  decoding the MIB; and
  determining that the non-serving cell actually transmits and receives data on the second frequency layer.

34. The device as recited in claim 33, wherein, if decoding of the MIB and the determining that the non-serving cell actually transmits and receives data on the second frequency layer, the method further comprises:
  identifying at least one of channel bandwidth and that a field in the MIB is set to value zero or the field is not present, and providing at least one result of:
    determining that the non-serving cell transmitting beacon signals on the first frequency layer is having actual data transmission and reception on the second frequency layer;
    declaring that the non-serving cell transmitting beacon signals on the first frequency layer as a barred one, if the device being a legacy device; and
    determining if the non-serving cell belongs to at least one of a 3GPP radio access technology (RAT) and a non 3GPP RAT based on the fields in the MIB.

35. The device as recited in claim 33, wherein the MIB comprises at least one of fields, a system frame number (SFN), channel bandwidth, value of number of transmit antennae, type of radio access technology (RAT) of the non-serving cell and network load of the non-serving cell for the second frequency layer, wherein the SFN and the value of the number of transmit antennae is used to identify common reference signal (CRS) resources for performing at least one of signal strength measurements and signal quality measurements of the non-serving cell for the first frequency layer.

\* \* \* \* \*